United States Patent [19]

LaRoche

[11] Patent Number: 5,239,460
[45] Date of Patent: Aug. 24, 1993

[54] ARRANGEMENT FOR MOTIVATING TELEMARKETING AGENTS

[75] Inventor: Nancy J. LaRoche, Broomfield, Colo.

[73] Assignee: AT&T Bell Laboratories, Murray Hill, N.J.

[21] Appl. No.: 637,382

[22] Filed: Jan. 3, 1991

[51] Int. Cl.⁵ .............................................. G06F 15/21
[52] U.S. Cl. ................................................. 364/401
[58] Field of Search ............ 364/401, 402, 408, 413.01, 364/400, 410, 419; 434/107, 238; 375/10; 379/34, 35; 455/226.1, 226.2, 226.3, 226.4

[56] References Cited

U.S. PATENT DOCUMENTS

| | | | |
|---|---|---|---|
| 3,525,818 | 8/1970 | Jaeger et al. | 379/35 |
| 4,006,538 | 2/1977 | Valentine | 35/19 A |
| 4,247,895 | 1/1981 | Weber | 364/419 |
| 4,510,351 | 4/1985 | Costello et al. | 179/27 |
| 4,671,772 | 6/1987 | Slade et al. | 434/219 |
| 4,694,483 | 9/1987 | Cheung | 379/34 |
| 4,812,126 | 3/1989 | Gilliksen | 434/238 |
| 4,863,384 | 9/1989 | Slade | 434/107 |
| 4,878,176 | 10/1989 | Teranishi et al. | 364/468 |
| 5,068,787 | 11/1991 | Pipella et al. | 364/401 |
| 5,103,408 | 4/1992 | Greenberg et al. | 364/400 |

OTHER PUBLICATIONS

U.S. Department of Commerce, Performance Management Record, Form CD-396, Rev. Mar. 1989.

Primary Examiner—Roy N. Envall, Jr.
Assistant Examiner—Jennifer L. Hazard
Attorney, Agent, or Firm—David Volejnicek

[57] ABSTRACT

In an ACD system, motivational feedback information, such as the cumulative number of bonus points earned, is displayed on agents' terminal displays. The information is real-time, up-to-date, and substantially continuously displayed. It combines an objective, quantitative measure, such as the number of calls handled, and a subjective, qualitative measure, such as a quality factor representing a supervisor's evaluation of the agents' observed performance in handling calls. Illustratively, the per-call quantitative measure is multipled by an agent's presently-assigned qualitative measure to arrive at the per-call number of bonus points earned by the agent.

12 Claims, 4 Drawing Sheets

AGENT STATUS TABLE 200

| AGENT I.D. | TERMINAL I.D. | # OF CALLS | QUALITY FACTOR | BONUS POINTS |
|---|---|---|---|---|
| 210 | 211 | 212 | 213 | 214 |
| • | • | • | • | • |
| • | • | • | • | • |
| • | • | • | • | • |

201

ARRANGEMENT FOR MOTIVATING TELEMARKETING AGENTS

TECHNICAL FIELD

This invention is directed to electronic telemarketing systems, such as automatic call distribution (ACD) systems.

BACKGROUND OF THE INVENTION

One of the major concerns of ACD system call managers is motivating their agents and maintaining the agents' interest and demeanor. Presently, no truly effective techniques for maintaining agent motivation appear to exist. The result is widespread low morale, high stress, and a high rate of turnover among ACD agents. The consequent human and dollar costs are high.

Call managers try to motivate agents by providing incentives, such as having contests between agents about who handles the greatest number of calls, or awarding bonus points for handled calls that are applied toward prizes. But, other than trying to keep their own count of calls handled or points awarded—a very difficult thing to do given the extremely busy nature of ACD agents' work—the agents typically do not have a ready and real-time source of up-to-date information of this sort. Lacking this information, they become bored, lax, and lose motivation. Furthermore, this purely quantitative form of motivation, e.g., based entirely on the numbers of calls handled, or sales made, can lead to undesirable results, such as agents trying to pass difficult and time-consuming calls to other agents, or being discourteous and curt with customers, in order to handle calls as fast as possible.

To forestall such undesirable results, call managers have, and employ, a capability of listening in on agents' calls, whereby they are able to evaluate the quality of agents' performance. But the call managers typically lack an effective way of immediately conveying the results of their evaluation to the agents. Hence, in order to either correct an agent's technique or to motivate the agent with praise, the manager must interrupt the agent's work and give him or her oral feedback. Because of the deleterious effect of such interruptions, the giving of feedback is typically reserved for the end of the agent's workday. But coming only at the work end, such feedback is not wholly effective. Furthermore, lacking such feedback during the workday, agents become bored, lax, and lose motivation.

SUMMARY OF THE INVENTION

This invention is directed to solving these and other disadvantages and problems of the prior art. According to the invention, there is provided a method and an arrangement for providing performance feedback to telemarketing agents, such as ACD system agents, as follows. Current measures of at least one of, and preferably of both of, quantitative and qualitative performance of each agent are obtained. The current measure or measures obtained for each individual agent are used to derive for each individual agent a current indicator of the individual agent's overall performance. Each individual agent's current indicator of overall performance is fed back to the individual agent, preferably through the agent's telecommunications terminal. For example, the current indicator is constantly displayed on the terminal. The procedure is performed repetitively.

In an illustrative embodiment of the invention, a factor representative of current qualitative performance of each agent is repeatedly obtained and each increment in quantitative performance of each agent is measured. Each measured increment for each individual agent is then modified by the factor for the individual agent so as to obtain a weighted increment for the individual agent. The obtained increment for each individual agent is then added to a sum of previously-obtained weighted increments for the individual agent to derive for each individual agent a current indicator of the individual agent's overall performance. Each individual agent's current indicator is then electronically constantly reported to the individual agent through their telecommunications terminal.

Every agent thereby constantly receives an up-to-date indication of their performance preferably in terms of both quantitative and qualitative criteria. This feedback serves to motivate the agents in their endeavors and to improve their performance.

These and other advantages and features of the invention will become apparent from the following description of an illustrative embodiment of the invention taken together with the drawing.

DETAILED DESCRIPTION

Figure 1:
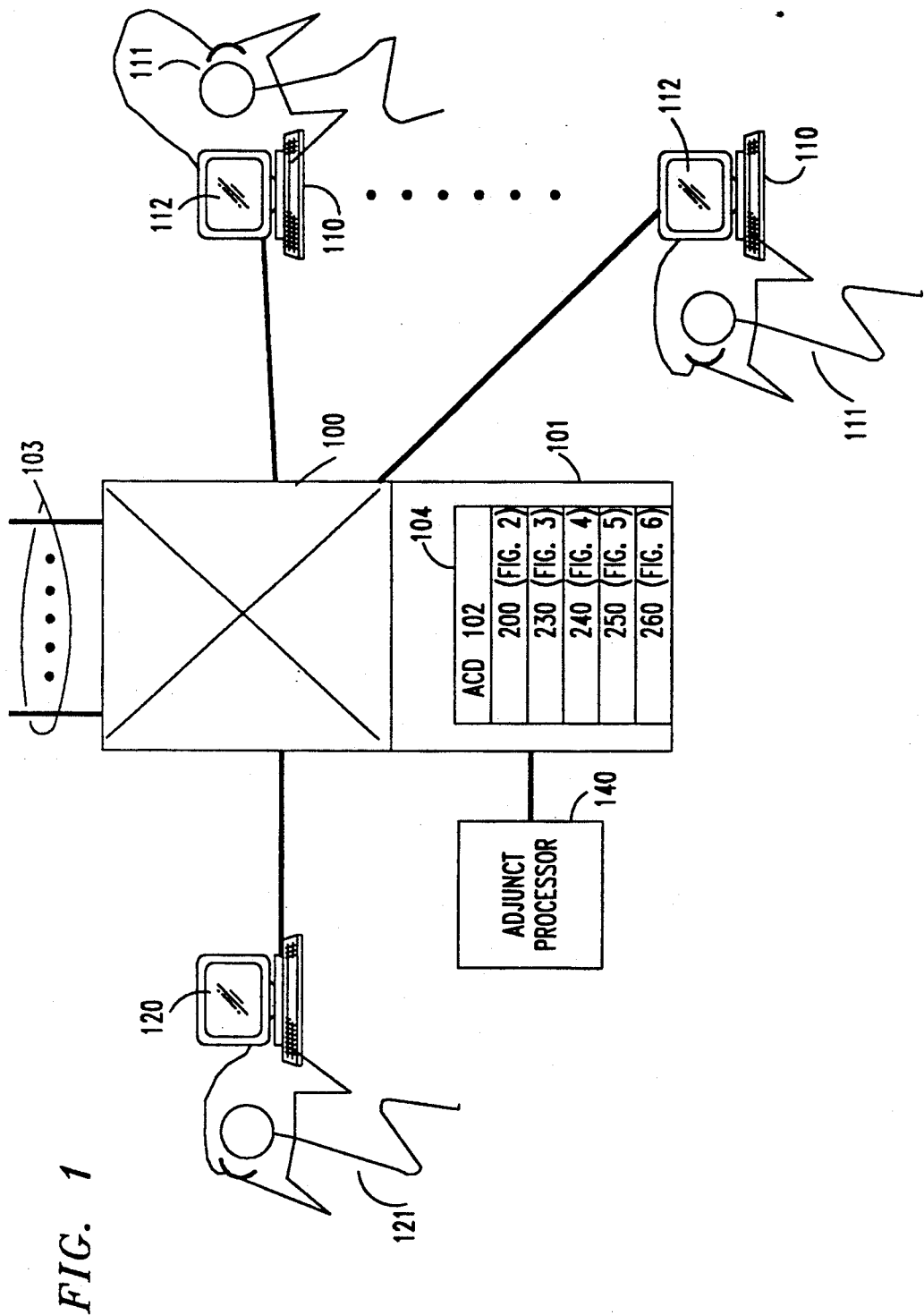
FIG. 1 is a block diagram of an ACD system that includes an illustrative embodiment of the invention.

FIG. 1 shows in block form an illustrative example of an ACD system. An ACD system is a telemarketing system wherein calls are distributed automatically among agents. The system comprises a plurality of telecommunication terminals 110, each staffed by an agent 111, connected to a switching system 100 which is in turn connected to a plurality of telecommunication links 103. Each terminal 110 is illustratively a data terminal and a telephone set, or a telephone set with a data display. Switching system 100 is illustratively a PBX, such as the AT&T System 85 or Definity ® PBX. Links 103 are illustratively telephony lines and trunks that connect switching system 100 to the public telephone system (not shown). Optionally, also connected to switching system 100 is an adjunct processor 140. Adjunct processor 140 is a record-keeping and report-generating system for switching system 100 functions, such as the CMS adjunct processor of AT&T. Switching system 100 includes, and is operated under control of, a processor 101 that executes an ACD program 102 which is stored in its memory 104. Illustratively, processor 101 causes incoming calls to be distributed and connected to idle terminals 110, and to be queued up for distribution when no terminals 110 are idle. Alternatively, processor 101 generates outgoing calls, and causes the generated calls to be distributed and connected to idle terminals 110. For each call, processor 101 generates a record of information, referred to hereinafter as switch-related information. Switch-related information includes, for example, the telephone number of the party to the call, and the number of presently queued calls. Processor 101 sends the switch-related information along with the corresponding call to the terminal 110 to which the call is connected, for display on that terminal's display 112.

Also connected to switching system 100 is a supervisory terminal 120 operated by a supervisor 121. Through supervisory terminal 120, supervisor 121 can listen in on calls being handled at terminals 110 by agents 111, and can provide input to processor 101 to affect the operation of the ACD system of FIG. 1.

As described so far, the system of FIG. 1 is conventional. According to an illustrative example of the invention, the conventional system is modified by adding to ACD program 102 in memory 104 the data structure 200 and routines 230, 240, 250, and 260 shown in FIGS. 2-6.

Figures 2, 3:
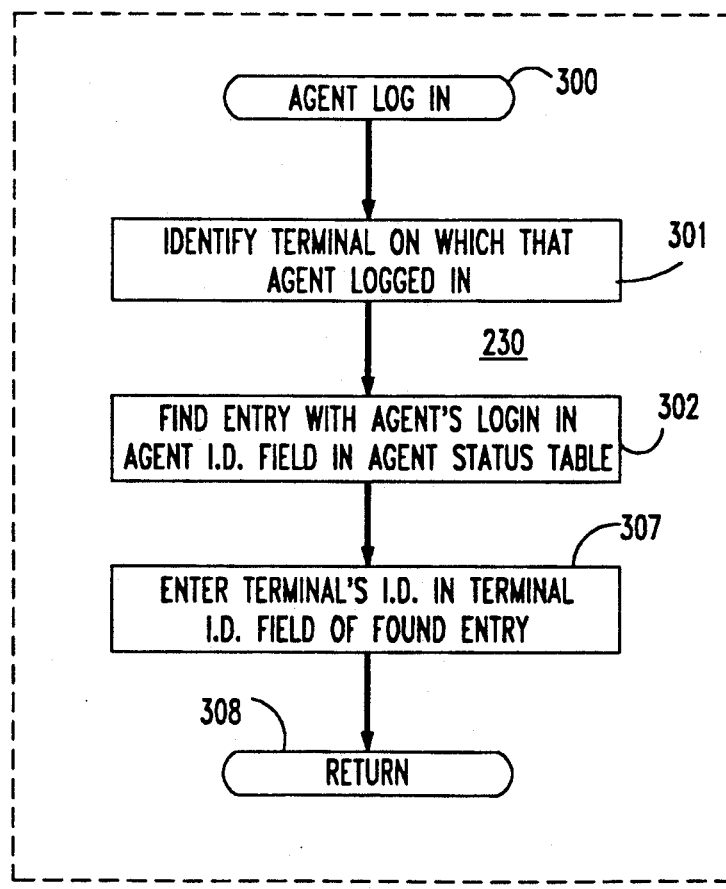
FIG. 2 is a diagram of an agent status table of the system of FIG. 1.
FIG. 3 is a flow diagram of an agent log-in routine of the system of FIG. 1.

An agent status table 200, shown in FIG. 2 is kept in a memory of processor 101. Table 200 contains a plurality of entries 201, one for each person that can serve as an agent 111. Each entry contains a plurality of data fields 210–214. An agent I.D. field 210 identifies the person who is the corresponding agent 111. A terminal I.D. field 211 identifies the terminal 110 which the corresponding agent 111 is using. A number-of-calls field 212 is a cumulative count of the calls handled by the corresponding agent 111. Alternatively, field 212 may contain some other objective, quantitative, measure of agent performance, e.g., the number or dollar value of sales made. A quality-factor field 213 stores a value that represents a subjective, qualitative, measure of agent performance. And a bonus points field 214 stores a value that represents the number of bonus points earned towards, e.g., a prize by the agent. The value stored in bonus points field 214 is arrived at through some combination of the values in quality-factor field 213 and number-of-calls field 212; illustratively, each increment in value to field 212 is multiplied by the value of field 213 and the result is added to the value in field 214. Illustratively, table 200 is initialized with fields 210 filled in with agent I.D.s, fields 211, 212, and 214 zeroed, and fields 213 set to a value representative of average quality, e.g., one.

When an agent 111 successfully logs in on the system of FIG. 1, routine 230 of FIG. 3 is invoked and executed. Upon its invocation, at step 300, routine 230 identifies the terminal 110 on which that agent 111 logged in, at step 301. Routine 230 then searches through table 200 to find the entry 201 whose agent I.D. field 210 contains the I.D.—illustratively the login—of that agent, at step 302. This entry 201 is that agent's associated entry. Routine 230 enters the I.D. of the terminal 110 on which the agent 111 logged in into terminal I.D. field 211 of the agent's associated entry 201, at step 307, and then returns to the point of its invocation, at step 308. In this manner, a terminal 110 becomes associated with an agent 111, and calls handled at that terminal 110 come to be credited to that agent 111.

Figure 4:
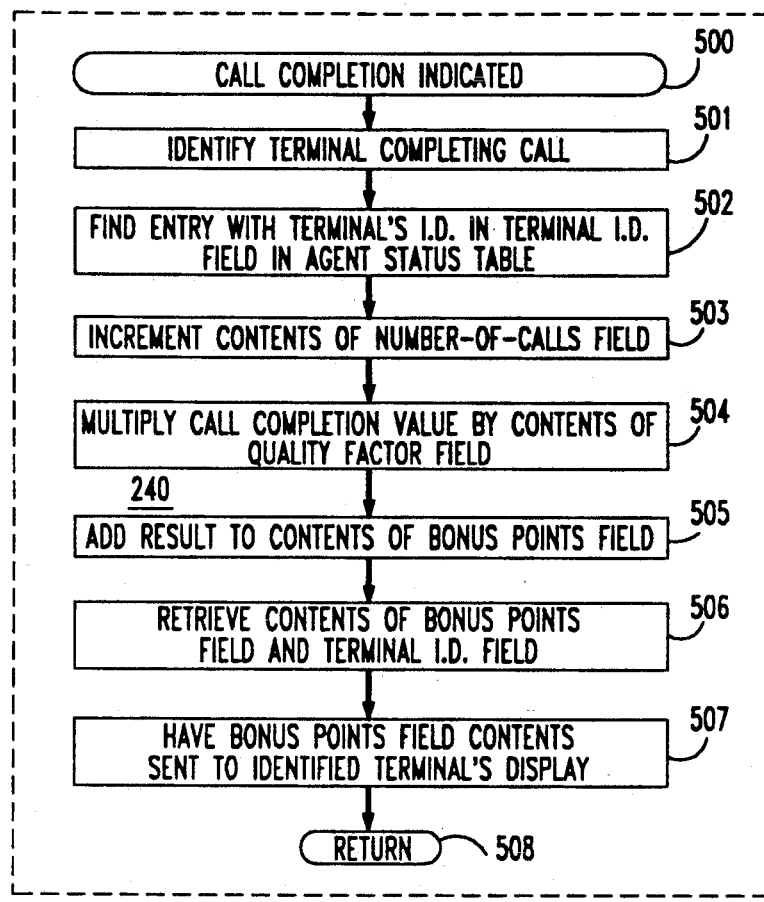
FIG. 4 is a flow diagram of a call-completion routine of the system of FIG. 1.

When handling of a call is completed at a terminal 110, the indication of call completion serves to invoke execution of routine 240 of FIG. 4. Upon its invocation, at step 500, routine 240 identifies the terminal 110 at which the call completion occurred, at step 501. Routine 240 then searches table 200 for the entry 201 that has that terminal's I.D. stored in its terminal I.D. field 211, at step 502. Upon finding that entry 201, routine 240 increments the contents of number-of-calls field 212 by the value assigned to the completion of a single call, e.g., by one, at step 503, thereby crediting the entry's associated agent 111 with the call completion. Routine 240 also multiplies the single call completion value by the factor stored in quality factor field 213, at step 504, and adds the result to the contents of bonus points field 214, at step 505, thereby awarding bonus points towards a prize to the agent who handled the call. Routine 240 then retrieves from the table 200 entry 201 the contents of bonus points field 214 and terminal I.D. field 211, at step 506, and forwards the contents of field 214 to ACD program 102 with a command to send them to the terminal 110 identified by contents of the retrieved terminal I.D. field 211, at step 507. Routine 240 then returns to the point of its invocation, at step 508.

ACD program 102 responds to the command by sending the contents of bonus points field 214 to the destination terminal 110, where they are displayed on that terminal's display 112. The agent 111 who is working at the destination terminal 110 thereby receives a continuous and up-to-date indication of the bonus points that he or she has earned so far. The real-time and up-to-date feedback so received serves to motivate the agent 111.

To evaluate the quality of call handling exhibited by agents 111, supervisor 121 occasionally monitors calls being handled by individual agents 111. As shown in dashed lines in FIG. 5, supervisor 121 elects to monitor an agent's handling of calls at a selected terminal 110, at step 600, proceeds to monitor that agent, in a conventional manner, at step 601, and evaluates the agent's performance in handling the monitored calls, at step 601. The evaluation may be based on any number of factors, principally subjective ones, such as courteousness, professionalism, speed and accuracy of response, etc. Supervisor 121 then inputs on terminal 120 a quality factor representative of the evaluation, at step 602. Illustratively, a quality factor of N (a positive number) is given to an agent 111 exhibiting average quality in handling calls, a quality factor of less than N is given to an agent 111 exhibiting below-average quality in handling calls, and a quality factor of greater than N is given to an agent 111 exhibiting above-average quality in handling calls.

Figure 5:
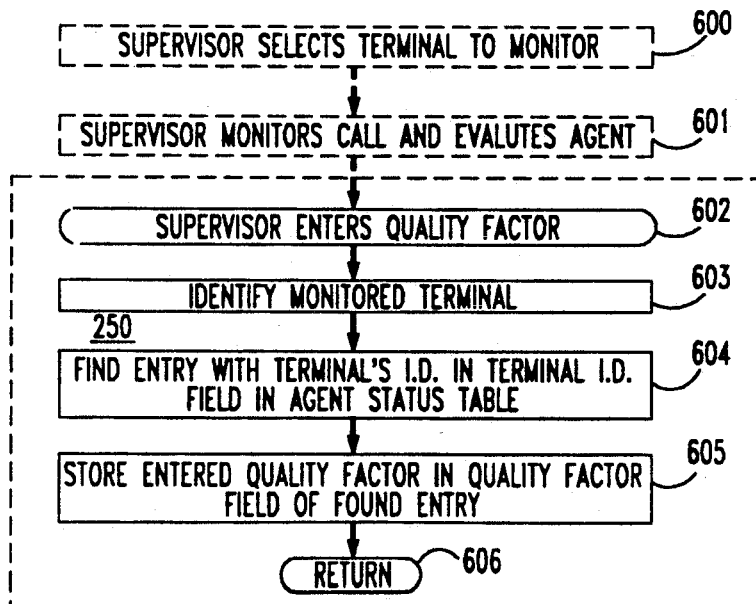
FIG. 5 is a flow diagram of a supervisor-evaluation routine of the system of FIG. 1.

Input of the quality factor by supervisor 121 triggers execution of routine 250 of FIG. 5. Upon its invocation, at step 602, routine 250 identifies the terminal 110 which supervisor 121 had monitored, at step 603, and then searches table 200 to find therein entry 201 which contains that terminal's I.D. in terminal I.D. field 211, at step 604. Upon finding that entry 201, routine 250 stores the quality factor which had been entered by supervisor 121 in quality factor field 213, at step 605, thereby associating the quality factor with the agent 111 that had been evaluated. Routine 250 then returns to the point of its invocation.

Figure 6:
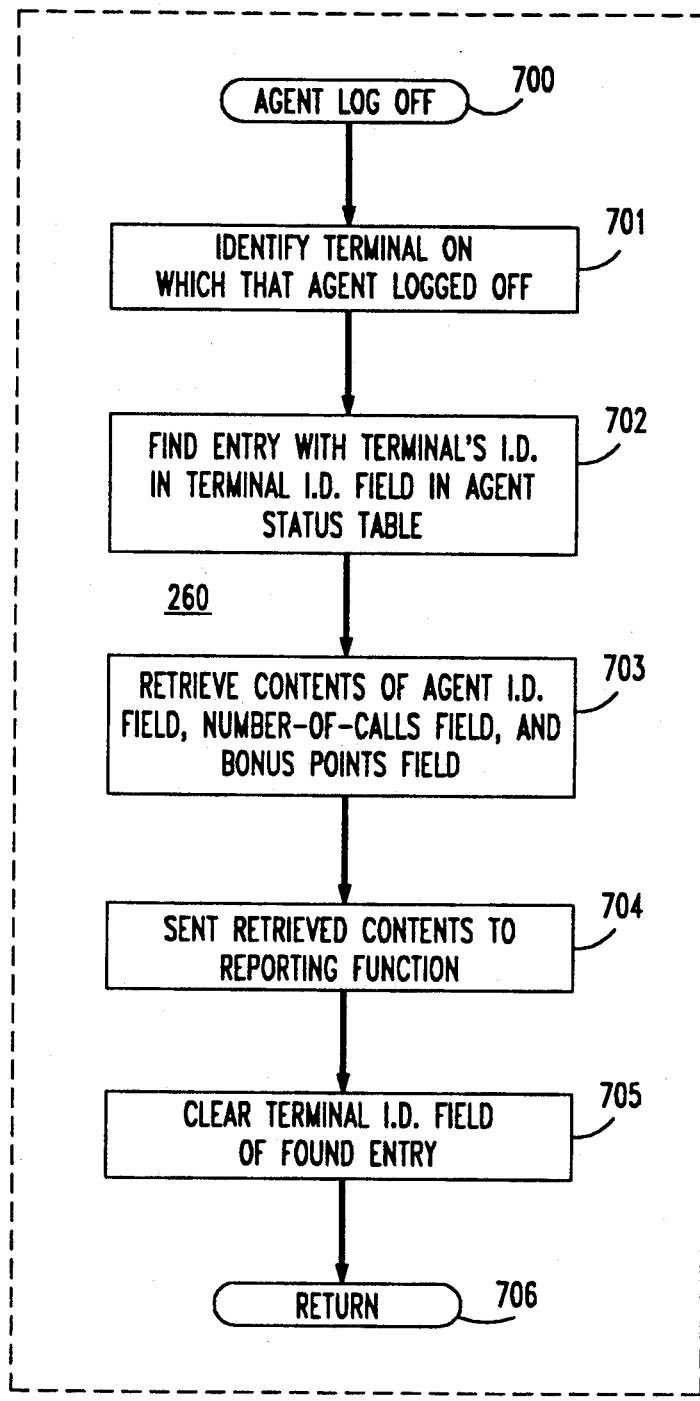
FIG. 6 is a flow diagram of an agent log-off routine of the system of FIG. 1.

When an agent 111 logs off of the system of FIG. 1, routine 260 of FIG. 6 is invoked and executed. Upon its invocation, at step 700, routine 260 identifies the terminal 110 on which that agent 111 logged off, at step 701. Routine 260 then searches through table 200 to find the entry 201 whose terminal I.D. field 211 contains the I.D. of the logging-off terminal 110, at step 702. Routine 260 retrieves contents of fields 210, 212, and 214 of that entry 201, at step 607, and sends them to some reporting function, e.g., CMS adjunct processor 140, at step 704.

The reporting function maintains a record of the number of calls handled and bonus points earned for each agent 110, and reports this information to supervisor 121 on demand.

Next, routine 260 clears terminal I.D. field 211 of the found entry 201, at step 705, thereby disassociating agent 111 from terminal 110. At step 705, routine 260 may or may not also clear contents of fields 212 and 214, depending upon whether it is desired that table 200 carry only daily information or cumulative information of agents' performance. After step 705, routine 260 returns to the point of its invocation, at step 706. The terminal and the agent are now both free to become associated with a different agent and terminal, respectively.

Of course, it should be understood that various changes and modifications may be made to the above-described illustrative embodiment of the invention. For example, not only the contents of the bonus points field, but also the contents of the number-of-calls and quality factor fields, may be sent to and displayed for agents on their terminal displays. Or, audible motivational feedback may be added to the visual, e.g., a bell may be rung at the agent's terminal when the agent accumulates enough bonus points to win a prize. Furthermore, the quantitative measure of performance may be based on transaction events other than calls, such as sales made, or questions answered. Each agent terminal may have event buttons, one for each type of event, and the agent presses the corresponding button when they have handled an event of that type in order to report the handling of the event to the ACD system. The different types of events may each have different bonus point values, and each may have a different qualitative factor associated with it. Such changes and modifications can be made without departing from the spirit and the scope of the invention. It is therefore intended that such changes and modifications be covered by the following claims.

I claim:

1. An arrangement for providing performance feedback to telemarketing agents, comprising:
   first means for repeatedly obtaining a current measure of quantitative performance of each agent during a workday of the agent;
   second means for repeatedly obtaining a current measure of qualitative performance of each agent;
   third means for using the obtained current measure of the qualitative performance and the obtained current measure of the quantitative performance for each individual agent repeatedly to derive for each individual agent a current indicator of overall performance of said individual agent during the workday of the individual agent; and
   fourth means for repeatedly feeding back each individual agent's current indicator of the overall performance to the individual agent during the workday of the individual agent, thereby to provide each individual agent with substantially real-time up-to-date feedback on the individual agent's overall performance.

2. The arrangement of claim 1 wherein:
   the first means comprising means for measuring for each agent each increment in the quantitative performance of the agent;
   the second means comprising means for repeatedly obtaining for each agent a factor representative of current said qualitative performance of the agent;
   the third means comprising means for modifying each measured increment for each individual agent by the factor for the individual agent to obtain a weighted increment for the individual agent, and adding the obtained weighted increment for each individual agent to a sum of previously-obtained weighted increments for the individual agent to derive for each individual agent a current indicator of the individual agent's said overall performance; and
   the fourth means comprising means for electronically reporting each individual agent's said current indicator to the individual agent through a telecommunications terminal of the individual agent.

3. The arrangement of claim 1 wherein:
   the first means comprising means for determining, for each agent, a first increment in a first cumulative measure of transaction events completed by the agent;
   the second means comprising means for obtaining, for each agent, a numerical factor representative of a supervisor's current evaluation of the agent's performance;
   the third means comprising means for multiplying, for each agent, the first increment by the numerical factor to obtain a second increment for a second cumulative measure of the agent's said overall performance and adding the second increment to the second cumulative measure to obtain a current cumulative measure of the agent's said overall performance; and
   the fourth means comprising means for electronically reporting, to each agent, the current cumulative measure of the agent's said overall performance.

4. The arrangement of claim 1 wherein:
   the first through the fourth means operate substantially immediately following every change in the individual agent's measure of performance.

5. The arrangement of claim 1 wherein:
   the third means derive the current indicator of overall performance for the individual agent and the fourth means feed back the individual agent's current indicator substantially immediately following every change in the individual agent's obtained current measure of performance.

6. An arrangement for providing performance feedback to agents in an automatic call distribution system having a plurality of telecommunication terminals for use by the agents and means for connecting calls to the terminals, comprising:
   means for storing, for each agent, a record of a number of transaction events completed by the agent, a quality factor currently assigned to the agent, and a current measure of cumulative overall performance of the agent;
   means, responsive to assignment of a new quality factor to the agent, for effecting storage of a record of the new quality factor in the storing means in place of the record of the quality factor heretofore stored for the agent in the storing means;
   means, substantially immediately responsive to completion of a transaction event by the agent, for incrementing the record of the number of transaction events completed by the agent;
   means, substantially immediately responsive either to incrementation of the record of the number of transaction events completed by the agent or to storage of the record of the new quality factor, for multiplying the increment by the quality factor and incrementing the record of the current measure of the cumulative overall performance by a result of the multiplication to obtain a record of a new current measure of the cumulative overall performance; and means, substantially immediately responsive to obtaining of the record of the new current measure of the cumulative overall performance, for electronically sending the record of the new current measure of the cumulative overall performance to a display of a terminal of the agent to visually report the new current measure to the agent, thereby to provide the agent with substantially real-time up-to-date feedback on the agent's overall performance.

7. A method of providing performance feedback to telemarketing agents, comprising the steps of:

repeatedly obtaining a current measure of quantitative performance of each agent during a workday of the agent;

repeatedly obtaining a current measure of qualitative performance of each agent;

using the obtained current measure of the qualitative performance and the obtained current measure of the quantitative performance for each individual agent repeatedly to derive for each individual agent a current indicator of the individual agent's overall performance of the individual agent during the workday of the individual agent; and repeatedly feeding back each individual agent's current indicator of the overall performance to the individual agent repeatedly during the workday of the individual agent, thereby to provide each individual agent with substantially real-time up-to-date feedback on the individual agent's overall performance.

8. The method of claim 7 wherein the step of repeatedly obtaining a current measure of quantitative performance comprises the step of measuring for each agent each increment in the quantitative performance of the agent;

the step of repeatedly obtaining a current measure of qualitative performance comprises the step of repeatedly obtaining for each agent a factor representative of current said qualitative performance of the agent;

the step of using the obtained current measures comprises the steps of modifying each measured increment for each individual agent by the factor for the individual agent to obtain a weighted increment for the individual agent, and adding the obtained weighted increment for each individual agent to a sum of previously-obtained weighted increments for the individual agent to derive for each individual agent a current indicator of the individual agent's said overall performance; and the step of repeatedly feeding back comprises the step of electronically reporting each individual agent's said current indicator to the individual agent through a telecommunications terminal of the individual agent.

9. The method of claim 7 wherein:

the step of repeatedly obtaining a current measure of quantitative performance comprises the step of determining, for each agent, a first increment in a first cumulative measure of transaction events completed by the agent;

the step of obtaining a current measure of qualitative performance comprises the step of obtaining for each agent, a numerical factor representative of a supervisor's current evaluation of the agent's performance;

the step of using the obtained current measures comprises the steps of multiplying, for each agent, the first increment by the numerical factor to obtain a second increment for a second cumulative measure of the agent's said overall performance; and adding, for each agent, the second increment to the second cumulative measure to obtain a current cumulative measure of the agent's said overall performance; and the step of repeatedly feeding back comprises the step of reporting electronically, to each agent, the current cumulative measure of the agent's said overall performance.

10. The method of claim 7 wherein:

the steps of claim 7 singly perform their functions substantially immediately following every change in the individual agent's measure of performance.

11. The method of claim 7 wherein:

the current indicator of overall performance for the individual agent is derived and fed back to the individual agent substantially immediately following every change in the individual agent's obtained current measure of performance.

12. A method of performance feedback to agents in an automatic call distribution system having a plurality of telecommunication terminals for use by the agents and means for connecting calls to the terminals, comprising the steps of:

initially storing, for each agent, a record of a number of transaction events completed by the agent, a quality factor currently assigned to the agent, and a current measure of cumulative overall performance of the agent;

effecting storage of a record of a new quality factor in place of the record of the quality factor heretofore stored for the agent, in response to assignment of the new quality factor to the agent;

incrementing the record of the number of transaction events completed by the agent, substantially immediately in response to completion of a transaction event by the agent;

multiplying the increment by the quality factor, substantially immediately in response either to incrementing of the record of the number of transaction events completed by the agent or to storage of the record of the new quality factor;

incrementing the record of the current measure of the cumulative overall performance by a result of the multiplication step, substantially immediately in response to multiplying of the increment by the quality factor, to obtain a record of a new current measure of the cumulative overall performance; and electronically sending the record of the new current measure of the cumulative overall performance to a display of a terminal of the agent to visually report the new current measure to the agent substantially immediately in response to obtaining the record of the new current measure of the cumulative overall performance, thereby to provide the agent with substantially real-time up-to-date feedback on the agent's overall performance.

* * * * *